United States Patent
Fold Von Bülow et al.

(10) Patent No.: US 12,040,485 B2
(45) Date of Patent: Jul. 16, 2024

(54) SODIUM METAL OXIDE MATERIAL FOR SECONDARY BATTERIES AND METHOD OF PREPARATION

(71) Applicant: TOPSOE BATTERY MATERIALS A/S, Kgs. Lyngby (DK)

(72) Inventors: Jon Fold Von Bülow, Copenhagen N (DK); Søren Dahl, Hillerød (DK)

(73) Assignee: TOPSOE BATTERY MATERIALS A/S, Kgs. Lyngby (DK)

( * ) Notice: Subject to any disclaimer, the term of this patent is extended or adjusted under 35 U.S.C. 154(b) by 586 days.

(21) Appl. No.: 17/281,087

(22) PCT Filed: Sep. 26, 2019

(86) PCT No.: PCT/EP2019/076059
§ 371 (c)(1),
(2) Date: Mar. 29, 2021

(87) PCT Pub. No.: WO2020/069971
PCT Pub. Date: Apr. 9, 2020

(65) Prior Publication Data
US 2021/0344009 A1  Nov. 4, 2021

(30) Foreign Application Priority Data
Oct. 5, 2018  (DK) .................... PA 2018 00687

(51) Int. Cl.
*H01M 4/02* (2006.01)
*H01M 4/04* (2006.01)
(Continued)

(52) U.S. Cl.
CPC ......... *H01M 4/525* (2013.01); *H01M 4/0471* (2013.01); *H01M 4/505* (2013.01)

(58) Field of Classification Search
CPC ........ H01M 4/525; H01M 4/523; H01M 4/58; H01M 4/0471; H01M 4/0438; H01M 4/043; H01M 4/505; H01M 4/502
See application file for complete search history.

(56) References Cited

U.S. PATENT DOCUMENTS

2006/0243094 A1  11/2006  Bryant et al.
2008/0118829 A1   5/2008  Nanno
(Continued)

FOREIGN PATENT DOCUMENTS

CN  101208443 A   6/2008
CN  105051953 A  11/2015
(Continued)

OTHER PUBLICATIONS

Office Action (First Office Action) issued on Aug. 22, 2022, by the China National Intellectual Property Administration in corresponding Chinese Patent Application No. 201980060035.5, and an English Translation of the Office Action. (10 pages).
(Continued)

*Primary Examiner* — Raymond Alejandro
(74) *Attorney, Agent, or Firm* — Boone IP Law

(57) ABSTRACT

The invention relates to a method of preparing a sodium metal oxide material comprising $Na_xM_yCo_zO_{2-\delta}$, where M is one or more of the following elements: Mn, Cu, Ti, Fe, Mg, Ni, V, Zn, Al, Li, Sn, Si, Ga, Ge, Sb, W, Zr, Nb, Mo, Ta, $0.7 \leq x \leq 1.3$, $0.9 \leq y \leq 1.1$, $0 \leq z < 0.15$, $0 \leq \delta \leq 0.2$ and wherein the average length of primary particles of said sodium metal oxide material is between 2 and 10 μm, preferably between 5 and 10 μm. The invention also relates to such a material.

16 Claims, 1 Drawing Sheet

(51) Int. Cl.
*H01M 4/505* (2010.01)
*H01M 4/525* (2010.01)

(56) References Cited

U.S. PATENT DOCUMENTS

| | | |
|---|---|---|
| 2010/0248040 A1 | 9/2010 | Fujimoto et al. |
| 2012/0183837 A1 | 7/2012 | Johnson et al. |
| 2016/0056460 A1 | 2/2016 | Kawada et al. |
| 2016/0149196 A1 | 5/2016 | Fan |
| 2016/0293945 A1 | 10/2016 | Hu et al. |
| 2017/0190595 A1 | 7/2017 | Sayers |
| 2017/0317350 A1* | 11/2017 | Ceder ............... H01M 4/0445 |
| 2018/0090758 A1 | 3/2018 | Xu et al. |
| 2018/0166686 A1 | 6/2018 | Kumakura et al. |
| 2018/0316056 A1* | 11/2018 | Katoh ............... H01M 10/054 |

FOREIGN PATENT DOCUMENTS

| | | | |
|---|---|---|---|
| EP | 1209124 A1 * | 5/2002 | ............. C01G 51/50 |
| EP | 3048659 A1 | 7/2016 | |
| IN | 108140826 A | 6/2018 | |
| JP | 6321973 B2 | 5/2018 | |
| WO | 2014115772 A1 | 7/2014 | |
| WO | 2016058402 A1 | 4/2016 | |
| WO | 2017009681 A1 | 1/2017 | |
| WO | 2017048341 A1 | 3/2017 | |
| WO | 2017125279 A1 | 7/2017 | |
| WO | 2019197812 A1 | 10/2019 | |

OTHER PUBLICATIONS

Danish Search Report issued in corresponding Patent Application No. PA2018 00687 dated May 1, 2019.

International Search Report (PCT/ISA/210) and Written Opinion (PCT/ISA/237) mailed on Jan. 7, 2020, by the European Patent Office as the International Searching Authority for International Application No. PCT/EP2019/076059.

Keller et al., "Layered Na-Ion Cathodes with Outstanding Performance Resulting from the Synergetic Effect of Mixed P- and O-Type Phases", Advanced Energy Materials, 2016, vol. 6, No. 3, pp. 1-11.

Wang et al., "Layered Oxide Cathodes for Sodium-Ion Batteries: Phase Transition, Air Stability, and Performance", Advanced Energy Materials, 2017, 24 pages.

International Search Report (PCT/ISA/210) and Written Opinion (PCT/ISA/237) mailed on Mar. 3, 2020, by the European Patent Office as the International Searching Authority for International Application No. PCT/EP2019/075858.

Search Report mailed on May 2, 2019, by the Danish Patent Office for corresponding Danish application No. PA 2018 00688 (8 pages).

Guo, S. et al."A. Layered P2- and O3-1ype Con1posite as a High-Energy Cathode for Rechargeable Sodhun-on Batteries" Angew. Chern. Jnt. Ed. 2015, vol. 54, pp. 5894-5899.

Guo, S. et al."A Layered P2- and O3-Type Composite as a High-Energy Cathode for Rechargeable Sodium-Ion Batteries" Supporting Information, Angewandte Chemie. (anie_20141 | 788_sm_miscellaneous_information.pdf), 2015, pp. S1-S11.

Bianchini, M. et al."Layered P2-O3 sodium-ion cathodes derived from earth abundant elements" Journal of Materials Chemistry A, J Mater Chem A, 2018, vol. 6, pp. 3552-3559.

Qi, X. et al."Design and Comparative Study of O3/P2 Hybrid Structures for Room Temperature Sodium-Ion Batteries" ACS Publications © 2017 American Chemical Society, 2017, vol. 9, pp. 10215-40223.

Qi, X. et al."Design and Comparative Study of O3/P2 Hybrid Structures for Room Temperature Sodium-Ion Batteries" Supporting Information, 2017, pp. S1- S7.

* cited by examiner

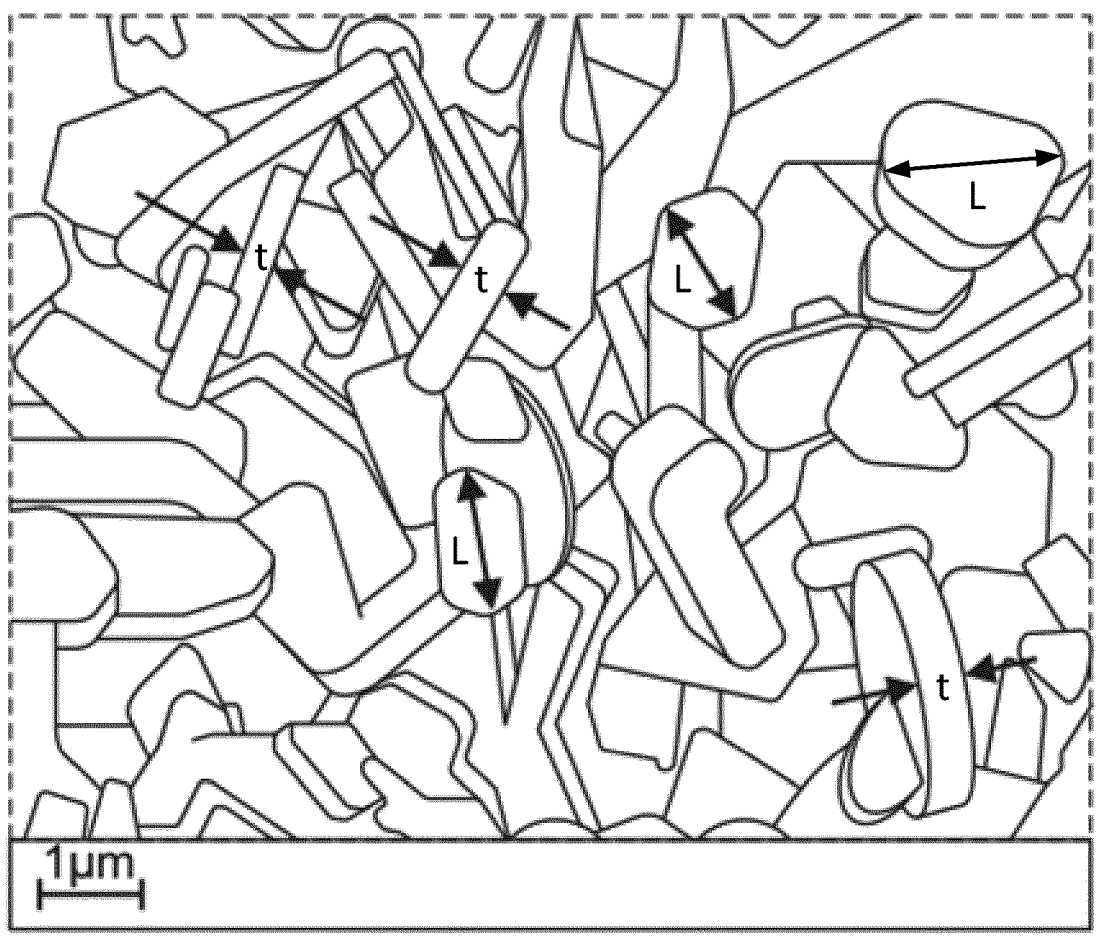

SODIUM METAL OXIDE MATERIAL FOR SECONDARY BATTERIES AND METHOD OF PREPARATION

FIELD OF THE INVENTION

Embodiments of the invention generally relate to a method of preparing a sodium metal oxide material for an electrode of a secondary battery. In particular, embodiments of the invention relate to preparing a sodium metal oxide material with the composition $Na_xM_yCo_zO_2$, where M is one or more of the following elements: Mn, Cu, Ti, Fe, Mg, Ni, V, Zn, Al, Li, Sn, Sb, and where $0.7 \leq x \leq 1.3$, $0.9 \leq y \leq 1.1$, $0 \leq z < 0.15$, $0 \leq \delta < 0.2$. Further embodiments of the invention relate to a sodium metal oxide material. In particular, the invention relates to a two phase sodium metal oxide material comprising the P2 and O3 phases.

BACKGROUND

Combustion of fossil fuels leads to a high level of carbon dioxide which is released to the atmosphere. The general consensus is that this pollution is a significant cause of global climate change. This generates an ever increasing demand for replacing conventional fossil fuels with clean energy. The intermittent nature of the clean and renewable energy generation that is employed in our societies today, requires economical and sustainable energy storage. In addition to Li-ion batteries (LIBs) and Lead acid batteries (PbA), Sodium-ion batteries (SIBs) are considered as a promising alternative for gridscale storage applications due to the natural abundance and low cost of sodium resources and the "rocking-chair" sodium storage mechanism that is similar to the one used in lithium-ion batteries.

The search for optimal electrode materials with superior electrochemical performance is currently the key development area of SIBs. Within this research area, layered transition metal oxides represent a class of excellent electrode materials owing in part to their environmental benignity, and facile synthesis. However, the large scale production of Na-ion cathode materials is still in its infancy and a major challenge is still to achieve optimal material powder properties (density, flowability, and stability) in order to advance the SIB technology to be commercially competitive with LIBs and PbA.

SUMMARY OF THE INVENTION

Embodiments of the invention generally relate to a sodium metal oxide material for an electrode of a secondary battery as well as a method of preparing such a sodium metal oxide material, in particular a two phase metal oxide material comprising the P2 and O3 phases. It is an object of the invention to provide a sodium metal oxide material having an improved electrochemical stability. It is also an object of the invention to provide a sodium metal oxide material wherein the length of the primary particles is increased compared to known sodium metal oxide materials. It is a further object of the invention to provide a sodium metal oxide material with a high tap density allowing for high loading of sodium metal oxide material within commercial electrodes. It is a further object of the invention to provide a sodium metal oxide material having a favorable or even optimal surface area.

One embodiment of the invention relates to a method of preparing a sodium metal oxide material comprising $Na_xM_y\text{-}Co_zO_{2-\delta}$, where M is one or more of the following elements: Mn, Cu, Ti, Fe, Mg, Ni, V, Zn, Al, Li, Sn, Si, Ga, Ge, Sb, W, Zr, Nb, Mo, Ta, $0.7 \leq x \leq 1.3$, $0.9 \leq y \leq 1.1$, $0 \leq z < 0.15$, $0 \leq \delta < 0.2$ and wherein the average length of primary particles of the sodium metal oxide material is between 2 and 10 μm, preferably between 5 and 10 μm. The method comprises the steps of:

a) Mixing precursor materials comprising sodium salt and a salt of at least one of the following elements: Mn, Cu, Ti, Fe, Mg, Ni, V, Zn, Al, Li, Sn, Si, Ga, Ge, Sb, W, Zr, Nb, Mo, Ta, to a mixed precursor, wherein the mixed precursor comprises carbonate;

b) Placing the mixed precursor in an oven and heating the oven to a temperature of up to a temperature of between 800 and 1000° C. to provide the sodium metal oxide material; and c) Cooling the sodium metal oxide material to room temperature in an atmosphere with less than 100 ppm $CO_2$;

where step b) comprises the sub-steps of:

b1) heating the oven to a first temperature T1 between 900 and 1000° C.;

b2) maintaining the temperature of the oven at the first temperature T1 until a specific phase distribution between P2 and O3 phases is achieved;

b3) cooling the oven to a second temperature T2, where T2 is between 800 and 950° C. and wherein T2 is 50-150° C. lower than T1; and b4) maintaining the temperature of the oven at the second temperature T2 until the sodium metal oxide material is substantially carbonate free.

When step b) of the method comprises the heating and cooling steps as indicated in steps b1) to b4), it is possible to provide a two phase material with the phases P2 and O3 and with a specific P2/O3 phase ratio. The specific phase distribution between P2 and O3 phases in step b2) is somewhat different from the final phase distribution of the sodium metal oxide material. Typically, the specific phase distribution has somewhat less O3 than the final phase distribution of the sodium metal oxide material. Step b4) ensures that the phase distribution is changed so that somewhat more O3 is present in the final material than in the material between steps b2) and b3). Typically, the material would have 5-20 wt % more O3 in the final material than in the material between steps b2) and b3). Thus, step b3) changes the phase distribution towards more O3, but only to an extent of 5-20 wt %. Thus, the final phase distribution of the sodium metal oxide material is still a phase distribution with both P2 and O3 phases; for example, each of the P2 and O3 phases are in a percentage of at least 20 wt %.

The term "the sodium metal oxide material is substantially carbonate free" is meant to denote that the sodium metal oxide material in equilibrium with air at step c4) forms an atmosphere that contains less than about 2000 ppm carbonate. Atmospheric air has about 400 ppm $CO_2$, but during steps b1) and b2) substantial amounts of $CO_2$, such as up to 20 vol %, can be detected within the oven. Step b4) is continued until the $CO_2$ level is less than 5000 ppm, e.g. 2000 ppm $CO_2$. The amount of the $CO_2$ may e.g be measured by a Carbondio 2000 gas module sensor (0-2000 ppm $CO_2$) from Pewatron AG. This $CO_2$ level corresponds to a $Na_2CO_3$ content in the sodium metal oxide material of maximum 0.5 wt % $Na_2CO_3$ as measured with thermal gravimetric analysis (TGA) using a Netzsch STA 409C that meets respective instrument and applications standards, including ISO 11358, ISO/DIS 9924, ASTM E1131, ASTM D3850, DIN 51006.

Typically, step b4) corresponds to maintaining the temperature of the oven until the substantially all sodium carbonate is decomposed. As an example, step b4) corresponds to maintaining the temperature of the oven at the temperature T2 between 5 and 20 hours, for example 8-10 hours. The term "maintaining the temperature" is meant to denote that the temperature remains relatively stable. However, smaller temperature changes of e.g. 10-20° C. are meant to be covered by the term "maintaining the temperature". The term "cooling the oven" is meant to cover both the instance that the material is maintained in one oven, the temperature of which is lowered, and the instance that the material is transported within an oven, from one hotter part to another, cooler part, e.g. on a conveyor belt.

As used herein, the term "oven" is meant to denote any appropriate vessel for heating to well above 500° C., such as a kiln or a furnace.

The salt(s) of the precursor materials can be any appropriate salt(s). One example is to use oxides or carbonates, such as sodium carbonate and carbonates of Ni and/or one of: Mn, Cu, Ti, Fe, and Mg. Alternatively, sodium nitrate or sodium hydroxide could be used. Typically, sulfates would not be used due to the sulfur that would remain in the material after preparation, nitrates would not be used in order to avoid NOx emissions during the heat treatment and chlorides would also rarely be used.

The atmosphere during step c) has below 100 ppm $CO_2$ and preferably below 50 ppm $CO_2$. Whilst step c) is carried out in a $CO_2$ poor atmosphere with less than 100 ppm $CO_2$, steps a) and b) are e.g. carried out in air.

By the method of the invention, a two phase material having good slurry properties as well as good power properties is obtainable.

In an embodiment, the mixing of precursor materials of step a) is in a dispersion, preferably an aqueous dispersion.

In an embodiment, the method further comprises step a2) of drying the mixed precursor to a mixed precursor having a moisture content between 2 and 15 wt %. The drying in step a2) is e.g. spray drying. In an embodiment, the atmosphere in the oven during step a) and/or during step b) is atmospheric air or in an atmosphere resembling air, such as between 75 and 85% nitrogen, between 15 and 25 oxygen, possibly some argon and possibly some $CO_2$.

According to another aspect, the invention relates to a sodium metal oxide material for an electrode of a secondary battery prepared by mixing precursor materials to a mixed precursor material, where the mixed precursor materials comprise carbonate; heat treating the mixed precursor materials to provide the sodium metal oxide material, where a heat treatment of said dried mixed precursor materials to a temperature of 975° C. until the sodium metal oxide material is substantially carbonate free and subsequent cooling would provide a single phase sodium metal oxide material, characterized in that said mixture of precursor materials has been heat treated according to steps b1)-b4) of the process of claim 1, thereby rendering said sodium metal oxide material as a two phase material comprising the P2 and O3 phases, where said sodium metal oxide material has a tap density of between 1.5 and 2.2 $g/cm^3$.

The heat treatment steps b1) to b4) provides for a two phase material, whilst a standard heat treatment at a constant temperature of 975° C. would provide for a single phase sodium metal oxide material.

It is an advantage of the material of the invention that it is a two phase material with a specific P2/O3 phase ratio since it is believed that the two phase material provides an improved electrochemical stability. As used herein, the phase composition of the sodium metal oxide material is in its discharged form after a number of cycles or in its pristine discharged form, viz. in its form as synthesized.

Within this context, the term "two phase material" is meant to denote a material having both phases P2 and O3, where each of these phases is present by at least 5 wt %, and where no other phases, such as P3, are present by more than 5 wt %. The expression "the material comprises" is meant to denote that the material may also comprise impurities, but that the material mainly has the indicated stoichiometry.

The specific phase distribution between P2 and O3 phases in step b2) is somewhat different from the final phase distribution of the sodium metal oxide material. Typically, the specific phase distribution has somewhat less O3 than the final phase distribution of the sodium metal oxide material. Step b4) ensures that the phase distribution is changed so that somewhat more O3 is present in the final material than in the material between steps b2) and b3). Typically, the material would have 5-20 wt % more O3 in the final material than in the material between steps b2) and b3). Thus, step b3) changes the phase distribution towards more O3, but only to an extent of 5-20 wt %. Thus, the final phase distribution of the sodium metal oxide material is still a phase distribution with both P2 and O3 phases, each in a percentage of at least 20 wt %.

As described in the article of Wang, P. F. et al "Layered Oxide Cathodes for Sodium-Ion Batteries: Phase Transition, Air Stability, and Performance", Advanced Energy Materials, 2018, 8(8), 1-23, a typical layered structure of $Na_xTMO_2$ consists of alternately stacking of edge sharing $TMO_6$ octahedral layers and Na ion layers. Here "TM" means transition metal. These sodium-based layered materials can be categorized into two main groups: P2 type or O3 type according to the surrounding $Na^+$ environment and the number of unique oxide layer stacking. This was first specified by Delmas et al. The symbols "P" and "O" represents a prismatic or octahedral coordination environment of Na ions, and the "2" or "3" suggests the number of transition metal layers with different kinds of O stacking in a single cell unit. Schematic illustration of crystal structures of P2 and O3 phases is depicted in FIG. 1 of the above cited article of Wang, P. F. et al.

P2-type $Na_xTMO_2$ consists of two kinds of $TMO_2$ layers (AB and BA layers) with all Na+ located at so-called trigonal prismatic (P) sites. Na+ could occupy two different types of trigonal prismatic sites: $Na_f$ ($Na_1$) contacts the two TMO6 octahedra of the adjacent slabs along its face, whereas $Na_e$ ($Na_2$) contacts the six surrounding $TMO_6$ octahedra along its edges. These adjacent $Na_f$ and $Na_e$ sites are too close to be occupied simultaneously because of the large Coulombic repulsion between two adjacent Na ions.

In O3-type $Na_xTMO_2$, owing to larger ionic radius of Na ions (1.02 Å) compared to 3d transition metal ions with a trivalent state (<0.7 Å), Na+ and 3d transition metal ions are accommodated at distinct octahedral sites with a cubic-close-packed (ccp) oxygen array. O3-type layered phases can be classified as one of the cation-ordered rock-salt superstructure oxides. Edge-shared $NaO_6$ and $TMO_6$ octahedra order into alternate layers which are perpendicular to [111], forming the $NaO_2$ and $TMO_2$ slabs, respectively. As a layered structure, $NaTMO_2$ is composed of crystallographically three kinds of $TMO_2$ layers, the so-called AB, CA, and BC layers, with different O stacking (see FIG. 1c of the above cited article of Wang, P. F., et al.) to describe the unit cell, and Na ions are accommodated at the so-called octahedral (O) sites between $TMO_2$ layers forming a typical O3-type layered structure.

The term "the sodium metal oxide material is substantially carbonate free" is meant to denote that the sodium metal oxide material has less than about 2000 ppm carbonate. Atmospheric air has about 400 ppm $CO_2$, but during steps b1) and b2) substantial amounts of $CO_2$, such as up to 20 vol %, can be detected within the oven. Step b4) is continued until the $CO_2$ level is less than 5000 ppm, e.g. 2000 ppm $CO_2$, measured by a Carbondio 2000 gas module sensor (0-2000 ppm $CO_2$) from Pewatron AG. This corresponds to a $Na_2CO_3$ content in the sodium metal oxide material of maximum 0.5 wt % $Na_2CO_3$ as measured with thermal gravimetric analysis (TGA) using a Netzsch STA 409C that meets respective instrument and applications standards, including ISO 11358, ISO/DIS 9924, ASTM E1131, ASTM D3850, DIN 51006.

"Tap density" is the term used to describe the bulk density of a powder (or granular solid) after consolidation/compression prescribed in terms of 'tapping' the container of powder a measured number of times, usually from a predetermined height. The method of 'tapping' is best described as 'lifting and dropping'. Tapping in this context is not to be confused with tamping, sideways hitting or vibration. The method of measurement may affect the tap density value and therefore the same method should be used when comparing tap densities of different materials. The tap densities of the present invention are measured by weighing a measuring cylinder before and after addition of at least 10 g of powder to note the mass of added material, then tapping the cylinder on the table for some time and then reading of the volume of the tapped material. Typically, the tapping should continue until further tapping would not provide any further change in volume. As an example only, the tapping may be about 120 or 180 times, carried out during a minute.

The tap density is a property that depends a lot on the particle size distribution and the tap densities referred to here are values measured on powders that have been milled to the following particle size distribution: $3~\mu m < d(0.1) < 7~\mu m$, $7~\mu m < d(0.5) < 14~\mu m$ and $14~\mu m < d(0.9) < 25~\mu m$. These tap densities and particle size distributions are appropriate for obtaining a sufficient capacity and an appropriate porosity of the sodium metal oxide material. The entire particle size distribution within a material, i.e. the volume fraction of particles with a certain size as a function of the particle size, is a way to quantify the size of particles in a suspension or a powder. In such a distribution, d(0.1) or D10 is defined as the particle size where 10% of the population lies below the value of d(0.1) or D10, d(0.5) or D50 is defined as the particle size where 50% of the population lies below the value of d(0.5) or D50 (i.e. the median), and d(0.9) or D90 is defined as the particle size where 90% of the population lies below the value of d(0.9) or D90. Commonly used methods for determining particle size distributions include dynamic light scattering measurements and scanning electron microscopy measurements, coupled with image analysis.

In an embodiment, the sodium metal oxide material comprising: $Na_xM_yCo_zO_{2-\delta}$, where M is one or more of the following elements: Mn, Cu, Ti, Fe, Mg, Ni, V, Zn, Al, Li, Sn, Si, Ga, Ge, Sb, W, Zr, Nb, Mo, Ta, and where $0.7 \leq x \leq 1.3$, $0.9 \leq y \leq 1.1$, $0 \leq z < 0.15$, $0 \leq \delta < 0.2$.

In an embodiment, M is one or more of the following elements: Mn, Cu, Ti, Fe, Mg, Ni, V, Zn, Al, Li, Sn, Si, Ga, Ge, Sb. In an embodiment, M is one or more of the following elements: Mn, Cu, Ti, Fe, Mg, Ni, V, Zn, Al, Li, Sn. In an embodiment, M comprises Ni and at least one further metal chosen from the group of: Mn, Cu, Ti, Fe, Mg. Preferred embodiments of such a sodium metal oxide material include: $Na_{0.78}Ni_{0.2}Fe_{0.38}Mn_{0.42}O_2$. In an embodiment, M comprises Ni and Mn. Preferred embodiments of such a sodium metal oxide material include: $Na_{1.0}Ni_{0.5}Mn_{0.5}O_2$. In an embodiment, M comprises Ni, Mn, Mg and Ti. Preferred embodiments of such a sodium metal oxide material include: $Na_{0.9}Ni_{0.3}Mn_{0.3}Mg_{0.15}Ti_{0.25}O_2$, $Na_{0.85}Ni_{0.283}Mn_{0.283}Mg_{0.142}Ti_{0.292}O_2$, $Na_{0.833}Ni_{0.318}Mn_{0.467}Mg_{0.10}Ti_{0.117}O_2$, $Na_{0.8}Ni_{0.267}Mn_{0.267}Mg_{0.133}Ti_{0.333}O_2$, and $Na_{0.75}Ni_{0.25}Mn_{0.25}Mg_{0.125}Ti_{0.375}O_2$.

In an embodiment, the average length of primary particles of said sodium metal oxide material is between 2 and 10 µm, preferably between 5 and 10 µm. Step b2) of the method of preparing the sodium metal oxide ensures that the primary particles sinter and grow to a size wherein the average length of the primary particles of the sodium metal oxide material is between 2 and 10 µm, preferably between 3 and 10 µm, more preferably between 5 and 10 µm. When the average length of primary particles of the sodium metal oxide material is between 3 and 10 µm, the structural stability and density of the sodium metal oxide material is improved. Preferably, the average length of the primary particles lies between 5 and 10 µm. The electrochemistry is improved when the average length of the primary particles is increased. Finally, the processing of the sodium metal oxide material to a battery cell is easier when the primary particles are large, in that the sodium metal oxide material is less dusty, packs easier and provides an appropriate loading in an electrode. For instance, x is between 0.8 and 1 in order to provide as high a capacity of the material as possible. The term "length of primary particles" is meant to denote the greatest of three dimensions of an object; therefore, the length of a primary particle is the widest facet or side of the primary particle. In the cases where the primary particles have a clearly widest side or facet, the dimension of such a largest side or facet is the length. Moreover, the length of the primary particle is the diameter, if the primary particle is disc-shaped and circular.

In an embodiment, z=0. This corresponds to a cobalt free material, which is advantageous in that cobalt is a scarce and costly element.

In an embodiment, the primary particles have a length and a thickness, where the thickness is smaller than the length, and where the average thickness of primary particles is between 1.0 and 4.0 µm, preferably between 2.0 and 3.5 µm. Typically, the primary particles have a platelet-like morphology with clear facets, where the largest dimension or an equivalent diameter of the primary particles is clearly larger than the thickness of the primary particles. See FIG. 1.

It should be noted that the average length of primary particles is determined per number of particles having a determinable length. Thus, if the length of a given number of particles on a SEM image of the primary particles of a material are determinable, a measure of the average length may be determined based upon those primary particles having a determinable length. Only a fraction of the particles in a SEM image may have a determinable length. Preferably, the determination of the average length is based upon a range of SEM images or similar images of primary particles of the material. Similar considerations apply to the average thickness of primary particles. Moreover, each of the particles contributing to the determination of the average length and/or average thickness should have a sensible size. Thus, if a particle has a length smaller than 0.01 µm or larger than 500 µm, such a particle is not to considered a part of the material and is thus not to contribute to the determination of the average length and/or the average thickness.

In an embodiment, the sodium metal oxide material is a double phase material having 20-40 wt % P2 phase and 60-80 wt % O3 phase as determined by Rietveld refinement of a powder X-ray diffractogram. It is an advantage of the invention that it is possible to provide a two phase material with a specific P2/O3 phase ratio. It seems that the P2 phase contributes to power capabilities of the material due to better Na-ion transport properties, while the O3 contributes to the capacity of the material.

In an embodiment, the tap density of said sodium metal oxide material is between 1.7 and 2.0 g/cm$^3$. Such a tap density and particle size distributions are appropriate for obtaining a sufficient capacity and an appropriate porosity of the sodium metal oxide material.

In an embodiment, the BET area is between 0.3 and 1 m$^2$/g. It is well-known that a low BET area is related to low degradation of the material when cycled in an electrochemical cell. However, too low a BET area has disadvantages and a BET area between 0.3 and 1 m$^2$/g seems to be a favorable or even optimal surface area.

SHORT DESCRIPTION OF THE FIGURE

FIG. 1 is a schematic drawing of a P2 type material with flake like primary particles.

DETAILED DESCRIPTION OF THE FIGURE

FIG. 1 is a schematic drawing of a P2 type material with flake like primary particles, such as the P2 type material Na$_{2/3}$Mn$_{0.7}$Fe$_{0.1}$Mg$_{0.1}$O$_2$. It is seen from FIG. 1, that the primary particles typically have a platelet-like morphology with clear facets, where the largest dimension or an equivalent diameter of the primary particles is clearly larger than the thickness of the primary particles. For a few of the primary particles, the length L or the thickness T has been indicated in FIG. 1. The primary particles are about 1-3 μm in diameter or length and 100-500 nm in thickness. FIG. 1 illustrates that particles have a largest dimension, the length, and a smallest dimension, the thickness. FIG. 1 also illustrates that for some particles, the length or the thickness may not be discernible. In this case only the thickness or the length of the particle is included in a determination of the average length and thickness of the particles in the sample.

The length L of a primary particle is thus the greatest of three dimensions of the primary particle and the thickness of the primary particle is the smallest of the three dimensions thereof.

EXAMPLE

Preparation of Sodium Metal Ion Material:

Precursor materials in the form of a physical mixture of raw material comprising carbonates of Na and Ni and at least one of the elements Mn, Cu, Ti, Fe, and Mg, are mixed in an aqueous dispersion and subsequently spray dried to a powder. The spray dried and mixed precursor material is placed in a sagger. The bulk density of the spray dried and mixed precursor material is about 0.7-1.0 g/cm3 and the sagger is filled so that the bed height of spray dried and mixed precursor material is higher than 35 mm. The mixed and spray dried precursor materials have a moisture content between 2 and 15 wt %. The naggers with 20-22 kg of mixed and spray dried precursor materials containing in total about 0.4-3.3 L of water are loaded into an oven. The oven used in this case is an electrically heated chamber furnace with five-side heating from Nabertherm (LH 216 with controller C 440) modified with controllable gas inlets.

Subsequently, a heat treatment program of the oven is started and the oven is heated up to oven top temperature of 500° C. with a ramp of 1-5 C.°/min without any gas flow through the oven. At these conditions, moisture can be observed condensing on the outside of the oven walls because it is not completely gas tight. When the temperature in the top of the oven reaches about 500° C., the powder reaches 280 C-320 C and the carbonates start decomposing in the saturated moisture atmosphere. At this point, a flow of air of between 20 and 100 L/min is started from the bottom of the oven to the top and it is gradually heated to 900-1000° C. with a ramp of between 1-5° C./min.

After several hours, such as between 5 and 20 hours, the oven is cooled in a flow of $CO_2$-free air of 1-100 L/min. When the oven has been cooled to about 500° C., nitrogen can be used as cooling medium until the oven reaches room temperature if a higher flow of nitrogen is available.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:

1. A method of preparing a sodium metal oxide material comprising Na$_x$M$_y$Co$_z$O$_{2-\delta}$, where M is one or more of the following elements: Mn, Cu, Ti, Fe, Mg, Ni, V, Zn, Al, Li, Sn, Si, Ga, Ge, Sb, W, Zr, Nb, Mo, Ta, $0.7 \leq x \leq 1.3$, $0.9 \leq y \leq 1.1$, $0 \leq z < 0.15$, $0 \leq \delta < 0.2$ and wherein the average length of primary particles of said sodium metal oxide material is between 2 and 10 μm, where said sodium metal oxide material has a tap density of between 1.5 and 2.2 g/cm$^3$, said method comprising the steps of:
   a) mixing precursor materials comprising sodium salt and a salt of at least one of the following elements: Mn, Cu, Ti, Fe, Mg, Ni, V, Zn, Al, Li, Sn, Si, Ga, Ge, Sb, W, Zr, Nb, Mo, Ta, to a mixed precursor, wherein the mixed precursor comprises carbonate;
   b) placing the mixed precursor in an oven and heating the oven to a temperature of up to a temperature of between 800 and 1000° C. to provide the sodium metal oxide material; and
   c) cooling the sodium metal oxide material to room temperature in an atmosphere with less than 100 ppm $CO_2$;
wherein step b) comprises the sub-steps of:
   b1) heating the oven to a first temperature T1 between 900 and 1000° C.;
   b2) maintaining the temperature of the oven at the first temperature T1 until a specific phase distribution between P2 and O3 phases is achieved, wherein each of the P2 and O3 phases are in a percentage of at least 20 wt %;
   b3) cooling the oven to a second temperature T2, where T2 is between 800 and 950° C. and wherein T2 is 50-150° C. lower than T1; and
   b4) maintaining the temperature of the oven at the second temperature T2 until the sodium metal oxide material is substantially carbonate free.

2. The method according to claim 1, wherein the mixing of precursor materials of step a) is in a dispersion.

3. The method according to claim 1, wherein the method further comprises step a2) of drying the mixed precursor to a mixed precursor having a moisture content between 2 and 15 wt %.

4. The method according to claim 1, wherein the atmosphere in the oven during step a) and/or during step b) is atmospheric air.

5. A sodium metal oxide material for an electrode of a secondary battery prepared by the process of claim 1, said sodium metal oxide material being a two phase material comprising the P2 and O3 phases in a percentage of at least 20 wt % each, where said sodium metal oxide material has a tap density of between 1.5 and 2.2 $g/cm^3$, said sodium metal oxide material comprising: $Na_xM_yCo_zO_{2-\delta}$, where M is one or more of the following elements: Mn, Cu, Ti, Fe, Mg, Ni, V, Zn, Al, Li, Sn, Si, Ga, Ge, Sb, W, Zr, Nb, Mo, Ta, and where $0.7 \leq x \leq 1.3$, $0.9 \leq y \leq 1.1$, $0 \leq z < 0.15$, $0 \leq \delta < 0.2$, wherein the average length of primary particles of said sodium metal oxide material is between 2 and 10 μm.

6. The sodium metal oxide material according to claim 5, wherein M is one or more of the following elements: Mn, Cu, Ti, Fe, Mg, Ni, V, Zn, Al, Li, Sn, Si, Ga, Ge, Sb.

7. The sodium metal oxide material according to claim 5, wherein M is one or more of the following elements: Mn, Cu, Ti, Fe, Mg, Ni, V, Zn, Al, Li, Sn.

8. The sodium metal oxide material according to claim 5, wherein M comprises Ni and at least one further metal chosen from the group of: Mn, Cu, Ti, Fe, Mg.

9. The sodium metal oxide material according to claim 5, wherein M comprises Ni and Mn.

10. The sodium metal oxide material according to claim 5, wherein M comprises Ni, Mn, Mg and Ti.

11. The sodium metal oxide material according to claim 5, wherein z=0.

12. The sodium metal oxide material according to claim 5, wherein the primary particles have a length and a thickness, where the thickness is smaller than the length, and where the average thickness of primary particles is between 1.0 and 4.0 μm.

13. The sodium metal oxide material according to claim 5, wherein the sodium metal oxide material comprises 20-40 wt % P2 phase and 60-80 wt % O3 phase.

14. The sodium metal oxide material according to claim 5, wherein the tap density of said sodium metal oxide material is between 1.7 and 2.0 $g/cm^3$.

15. The sodium metal oxide material according to claim 5, wherein the BET area is between 0.3 and 1 $m^2/g$.

16. A sodium metal oxide material for an electrode of a secondary battery, said sodium metal oxide material being a two phase material comprising P2 and O3 phases in a percentage of at least 20 wt % each, where said sodium metal oxide material has a tap density of between 1.5 and 2.2 $g/cm^3$, said sodium metal oxide material comprising: $Na_xM_yCo_zO_{2-\delta}$, where M is one or more of the following elements: Mn, Cu, Ti, Fe, Mg, Ni, V, Zn, Al, Li, Sn, Si, Ga, Ge, Sb, W, Zr, Nb, Mo, Ta, and where $0.7 \leq x \leq 1.3$, $0.9 \leq y \leq 1.1$, $0 \leq z < 0.15$, $0 \leq \delta < 0.2$, wherein the average length of primary particles of said sodium metal oxide material is between 2 and 10 μm.

* * * * *